(12) United States Patent
Coady et al.

(10) Patent No.: US 12,009,678 B2
(45) Date of Patent: Jun. 11, 2024

(54) OPPORTUNISTIC CHARGING SYSTEM FOR AN AUTOMATED STORAGE AND RETRIEVAL SYSTEM

(71) Applicant: Walmart Apollo, LLC, Bentonville, AR (US)

(72) Inventors: Matthew W. Coady, Hollis, NH (US); William J. Fosnight, Windham, NH (US); David A. Lachance, Waltham, MA (US); David Eiselen, Groton, MA (US)

(73) Assignee: Walmart Apollo, LLC, Bentonville, AR (US)

( * ) Notice: Subject to any disclaimer, the term of this patent is extended or adjusted under 35 U.S.C. 154(b) by 128 days.

(21) Appl. No.: 16/269,900

(22) Filed: Feb. 7, 2019

(65) Prior Publication Data

US 2019/0245366 A1 Aug. 8, 2019

Related U.S. Application Data

(60) Provisional application No. 62/628,159, filed on Feb. 8, 2018.

(51) Int. Cl.
*H02J 7/00* (2006.01)
*B65G 1/04* (2006.01)
(Continued)

(52) U.S. Cl.
CPC .......... *H02J 7/0013* (2013.01); *B65G 1/0492* (2013.01); *B65G 1/065* (2013.01);
(Continued)

(58) Field of Classification Search
CPC .......... H02J 7/0045; H02J 7/04; H02J 7/0027; H02J 7/00; B65G 1/04; B65G 1/06;
(Continued)

(56) References Cited

U.S. PATENT DOCUMENTS

| 6,265,851 B1* | 7/2001 | Brien | H02J 50/90 320/137 |
|---|---|---|---|
| 6,291,900 B1* | 9/2001 | Tiemann | H02P 9/04 322/1 |

(Continued)

FOREIGN PATENT DOCUMENTS

| AU | 2019218868 | 7/2020 |
|---|---|---|
| CA | 3088553 | 8/2019 |

(Continued)

OTHER PUBLICATIONS

International Search Report and Written Opinion dated Apr. 5, 2019 in International Patent Application No. PCT/US2019/017078.
(Continued)

*Primary Examiner* — Drew A Dunn
*Assistant Examiner* — Pamela J Jeppson
(74) *Attorney, Agent, or Firm* — Fitch, Even, Tabin & Flannery LLP (57) ABSTRACT

An opportunistic rail charging system is disclosed for recharging power supplies on mobile robots transporting goods within an automated order fulfillment system. Individual chargers may be incorporated into each mobile robot for converting a facility line voltage from the charge rail to a voltage for which the rechargeable power supplies on each mobile robot are rated.

20 Claims, 6 Drawing Sheets

(51) Int. Cl.
   *B65G 1/06*     (2006.01)
   *B65G 1/137*    (2006.01)
   *H02J 7/04*     (2006.01)
(52) U.S. Cl.
   CPC .......... *B65G 1/1373* (2013.01); *H02J 7/0042*
         (2013.01); *H02J 7/0044* (2013.01); *H02J*
         *7/0045* (2013.01); *H02J 7/04* (2013.01)
(58) Field of Classification Search
   CPC ...... B65G 1/137; B65G 1/373; B65G 1/0492;
                                              B65G 1/065
   USPC ........................................................ 320/107
   See application file for complete search history.

(56)              References Cited

U.S. PATENT DOCUMENTS

| | | | |
|---|---|---|---|
| 6,498,454 B1 * | 12/2002 | Pinlam ................... | H02J 7/0027 |
| | | | 320/107 |
| 6,931,304 B1 * | 8/2005 | Miller ................ | G11B 15/6835 |
| | | | 700/214 |
| 7,101,139 B1 * | 9/2006 | Benedict ................... | B66B 9/00 |
| | | | 180/7.1 |
| 8,193,761 B1 * | 6/2012 | Singh ....................... | B60L 50/40 |
| | | | 307/64 |
| 8,622,194 B2 | 1/2014 | DeWitt et al. | |
| 8,977,393 B1 * | 3/2015 | Kohler ..................... | H02J 50/40 |
| | | | 700/248 |
| 9,395,723 B2 * | 7/2016 | Pari ....................... | G05D 1/0022 |
| 9,469,208 B2 | 10/2016 | Dorval | |
| 9,598,239 B2 | 3/2017 | Lert, Jr. | |
| 9,815,625 B2 | 11/2017 | DeWitt et al. | |
| 11,565,598 B2 | 1/2023 | Dorval | |
| 2004/0130292 A1 * | 7/2004 | Buchanan ............... | B60L 53/67 |
| | | | 320/116 |
| 2006/0043930 A1 * | 3/2006 | Koyanagi ............. | H02J 7/0068 |
| | | | 320/114 |
| 2006/0262447 A1 * | 11/2006 | Hoshino ............ | G11B 15/6835 |
| 2007/0065258 A1 * | 3/2007 | Benedict ................... | B65G 1/04 |
| | | | 414/266 |
| 2009/0127864 A1 * | 5/2009 | Alvite ....................... | F03B 17/04 |
| | | | 74/DIG. 9 |
| 2011/0248681 A1 * | 10/2011 | Miller ................... | H02J 7/0018 |
| | | | 320/126 |
| 2012/0126619 A1 * | 5/2012 | Singh ..................... | B60L 3/0046 |
| | | | 307/64 |
| 2012/0152877 A1 * | 6/2012 | Tadayon .............. | B25J 11/0085 |
| | | | 901/30 |
| 2014/0163730 A1 * | 6/2014 | Mian .......................... | B25J 9/16 |
| | | | 700/248 |
| 2014/0292231 A1 * | 10/2014 | Kanada ..................... | H02J 1/10 |
| | | | 318/440 |
| 2015/0032252 A1 * | 1/2015 | Galluzzo .............. | G05D 1/0248 |
| | | | 700/218 |
| 2015/0263541 A1 * | 9/2015 | Fukui ....................... | H02J 7/00 |
| | | | 320/134 |
| 2016/0221757 A1 * | 8/2016 | DeWitt ..................... | B65G 1/04 |
| 2016/0236869 A1 * | 8/2016 | Kimura ................. | B65G 1/1378 |
| 2016/0325932 A1 * | 11/2016 | Hognaland .......... | B65G 1/0464 |
| 2016/0355337 A1 * | 12/2016 | Lert ..................... | B65G 1/0492 |
| 2017/0158430 A1 * | 6/2017 | Raizer ..................... | B65G 1/065 |
| 2017/0274423 A1 | 9/2017 | Tayduchok et al. | |

FOREIGN PATENT DOCUMENTS

| | | | |
|---|---|---|---|
| CN | 105186641 A | * | 12/2015 |
| CN | 205200876 | | 5/2016 |
| CN | 205200876 U | * | 5/2016 |
| CN | 112166538 | | 1/2021 |
| EP | 3750225 | | 12/2020 |
| JP | 04185234 | | 7/1992 |
| JP | 2003502996 | | 1/2003 |
| JP | 2006068846 | | 3/2006 |
| JP | 2007535282 | | 11/2007 |
| JP | 2010515570 | | 5/2010 |
| JP | 7289310 | | 6/2023 |
| JP | 2023101657 | | 7/2023 |
| KR | 101097730 B1 | * | 12/2011 |
| KR | 101482519 | | 1/2015 |
| MX | 2020008071 | | 9/2020 |
| TW | 201941513 | | 10/2019 |
| WO | 200077918 | | 12/2000 |
| WO | 2008089150 | | 7/2008 |
| WO | 2013035448 | | 3/2015 |
| WO | 2019157196 | | 8/2019 |
| WO | 2021058442 | | 4/2021 |

OTHER PUBLICATIONS

Examination Report dated Jan. 14, 2021 in Australian Patent Application No. 2019218868.
Response to Examination Report filed Nov. 17, 2021 in Australian Patent Application No. 2019218868.
Second Examination Report dated Dec. 9, 2021 in Australian Patent Application No. 2019218868.
Examiner's Report dated Sep. 2, 2021 in Canadian Patent Application No. 3,088,553.
Office Action dated Sep. 8, 2021 in Japanese Patent Application No. 2020-541772.
Machine Translation and English language Abstract of WO2013035448 published Mar. 23, 2015.
English language Abstract of JP2006068846 published Mar. 16, 2006.
English language Abstract of JP2007535282 published Nov. 29, 2007.
English language Abstract of CN205200876 published May 4, 2016.
Office Action dated Sep. 15, 2021 in European Patent Application No. 19707199.6.
Response filed Mar. 24, 2021 in European Patent Application No. 19707199.6.
Amendment filed Feb. 8, 2022, with English language translation of claims as amended, in Japanese Patent Application No. 2020-541772.
Communication pursuant to Article 94(3) EPC dated May 19, 2022, in European Patent Application No. 19707199.6.
English language Abstract for KR101482519 published Jan. 22, 2015.
Office Action dated Jul. 6, 2022 in Japanese Patent Application No. 2020-541772.
Amendment filed Dec. 21, 2021 in Australian Patent Application No. 2019218868.
Notice of Acceptance dated Jan. 10, 2022 in Australian Patent Application No. 2019218868.
Amendment filed Jan. 4, 2022 in Canadian Patent Application No. 3088553.
Amendment filed Jan. 14, 2022 in European Patent Application No. 19707199.6.
Response to Office Action dated Sep. 28, 2022 in European Patent Application No. 19707199.6.
Response to Office Action dated Jan. 6, 2023 in Japanese Patent Application No. 2020-541772.
EPO; App. No. 19707199.6; Communication Pursuant to Article 94(3) EPC dated Sep. 15, 2021; (5 pages).
EPO; App. No. 19707199.6; Communication Pursuant to Article 94(3) EPC dated May 19, 2022; (4 pages).
EPO; App. No. 19707199.6; Communication Pursuant to Rules 161(1) and 162 EPC dated Sep. 15, 2020; (3 pages).
IPA; App. No. 2019218868; Examination Report No. 1 dated Jan. 14, 2021; (4 pages).
IPA; App. No. 2019218868; Examination Report No. 2 dated Dec. 9, 2021; (3 pages).
IPA; App. No. 2019218868; Notice of Acceptance dated Jan. 10, 2022; (3 pages).
CIPO; App. No. 3,088,553; Examiner's Report dated Sep. 2, 2021; (5 pages).

(56) References Cited

OTHER PUBLICATIONS

CIPO; App. No. 3,088,553; Notice of Allowance dated Jul. 7, 2022; (1 page).
JPO; App. No. 2020541772; Notification of Reasons for Rejection dated Jul. 6, 2022; (8 pages).
JPO; App. No. 2020541772; Decision to Grant dated Apr. 13, 2023; (2 pages).
EPO; App. No. 19707199.6; Communication Pursuant to Article 94(3) EPC dated Oct. 2, 2023; (5 pages).
EPO; App. No. 19707199.6; Office Action dated Oct. 10, 2023; (7 pages).
IMPI; App. No. MX/a/2020/008071; Office Action mailed Feb. 2, 2024; (10 pages).

* cited by examiner

OPPORTUNISTIC CHARGING SYSTEM FOR AN AUTOMATED STORAGE AND RETRIEVAL SYSTEM

PRIORITY CLAIM

The present application claims priority to U.S. Provisional Patent Application No. 62/628,159, filed on Feb. 8, 2018, entitled "OPPORTUNISTIC CHARGING SYSTEM FOR AN AUTOMATED STORAGE AND RETRIEVAL SYSTEM," which application is incorporated by reference herein in its entirety.

BACKGROUND

An automated order fulfillment system for use in supply chains may fulfill orders for individual product items, also referred to herein as "eaches." Traditional order fulfillment facilities store eaches in containers in a multi-level storage structure with a vertical and horizontal array of storage spaces. The automated order fulfillment system further includes mobile robots which move horizontally and vertically within the storage structure to transfer containers to and from the storage spaces within the structure.

It is known to power these mobile robots with onboard energy storage devices which require periodic recharging. The most common solution is to employ discrete charging stations, generally located at a variety of locations through the structure. When a robot needs recharging, the Material Control System (MCS) directs the robot to a charge station to recharge. While there may be several charge station, this method of recharge diverts the robots from their order fulfillment tasks.

Another approach, such as disclosed in U.S. Pat. No. 9,815,625 assigned to Opex Corporation, supplies a voltage to a charge rail along which the robot moves during it order fulfillment operations. Thus, a robot can recharge as it performs its tasks by connection to the charge rail. Such systems have been configured so that a DC power supply or battery charger is located between the power source (such as a wall outlet) and the charge rail. These conventional charge rail systems provide enough power to quickly charge a single mobile robot, or several at a lower charge rate. Additionally, every charge rail requires its own charger/DC power supply adding cost, increased system complexity, and reduced reliability.

SUMMARY

The present technology relates to an opportunistic battery charging system for mobile robots within an order fulfillment system. The battery charging system includes one or more charge rails engaged by the robots as they perform their order fulfillment tasks so as to opportunistically charge during normal inventory retrieval and delivery operations. The one or more charge rails may be provided on vertical towers and/or horizontal rails of a track system used by the mobile robots to travel throughout an inventory storage structure. The one or more charge rails may receive the relatively high, unregulated voltage from the facility power source, such as for example between 120 and 240 VAC. Each mobile robot may include a rechargeable energy storage device, such as for example a bank of supercapacitors, having a high charge capacity and capable of fast charging times. Each mobile robot may further include an onboard charger for recharging the energy storage device. Fixed installation costs are minimized, since only overcurrent protection (fuse or circuit breaker) is required to power the rail.

As the mobile robots move along the charge rail, the chargers in each mobile robot convert the voltage from the rail into a voltage for which the rechargeable energy storage device is rated. As the voltage on the rail is relatively high as compared to the voltage used in each mobile robot energy storage device, multiple robots may be quickly recharged off the same charge rail simultaneously. Additionally, the chargers control the flow of current to each energy storage device on each mobile robot connected to the same rail. Thus, multiple robots may be rapidly recharged in a controlled manner from a single charge rail.

In an embodiment, the present technology relates to a power supply system for a plurality of mobile robots in a facility, comprising: a charge rail mounted in a track system along which the plurality of mobile robots travel, the charge rail configured to carry a first voltage; a plurality of chargers comprising a charger on each of the plurality of mobile robots, the charger on each of the plurality of mobile robots converting the first voltage from the charge rail to a second voltage smaller than the first voltage; a plurality of rechargeable energy storage devices comprising a rechargeable energy storage device on each of the plurality of mobile robots, the rechargeable energy storage device on each of the plurality of mobile robots being charged by the second voltage.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the Background.

DETAILED DESCRIPTION

The present technology, roughly described, relates to an opportunistic rail charging system for recharging power supplies on mobile robots transporting goods within an automated order fulfillment system. In accordance with aspects of the present technology, one or more charge rails for charging the mobile robots may be incorporated into a track system along which the robots travel during normal inventory retrieval and delivery operations. In further aspects of the present technology, individual chargers are incorporated into each mobile robot for converting a voltage from the charge rail to a voltage for which the rechargeable power supplies on each mobile robot are rated. The individual chargers allow the charge rail to utilize a high voltage at a low current on the charge rail. The low current enables the use of a charge rail having a small cross-sectional area. Additionally, the individual chargers and the high voltage on a charge rail allows several mobile robots to quickly and efficiently recharged off the same charge rail simultaneously.

It is understood that the present invention may be embodied in many different forms and should not be construed as being limited to the embodiments set forth herein. Rather, these embodiments are provided so that this disclosure will be thorough and complete and will fully convey the invention to those skilled in the art. Indeed, the invention is intended to cover alternatives, modifications and equivalents of these embodiments, which are included within the scope and spirit of the invention as defined by the appended claims. Furthermore, in the following detailed description of the present invention, numerous specific details are set forth in order to provide a thorough understanding of the present invention. However, it will be clear to those of ordinary skill in the art that the present invention may be practiced without such specific details.

The terms "top" and "bottom," "upper" and "lower" and "vertical" and "horizontal" as may be used herein are by way of example and for illustrative purposes only, and are not meant to limit the description of the invention inasmuch as the referenced item can be exchanged in position and orientation. Also, as used herein, the terms "substantially" and/or "about" mean that the specified dimension or parameter may be varied within an acceptable manufacturing tolerance for a given application. In one embodiment, the acceptable manufacturing tolerance is ±0.25% of a given dimension.

Figure 1:
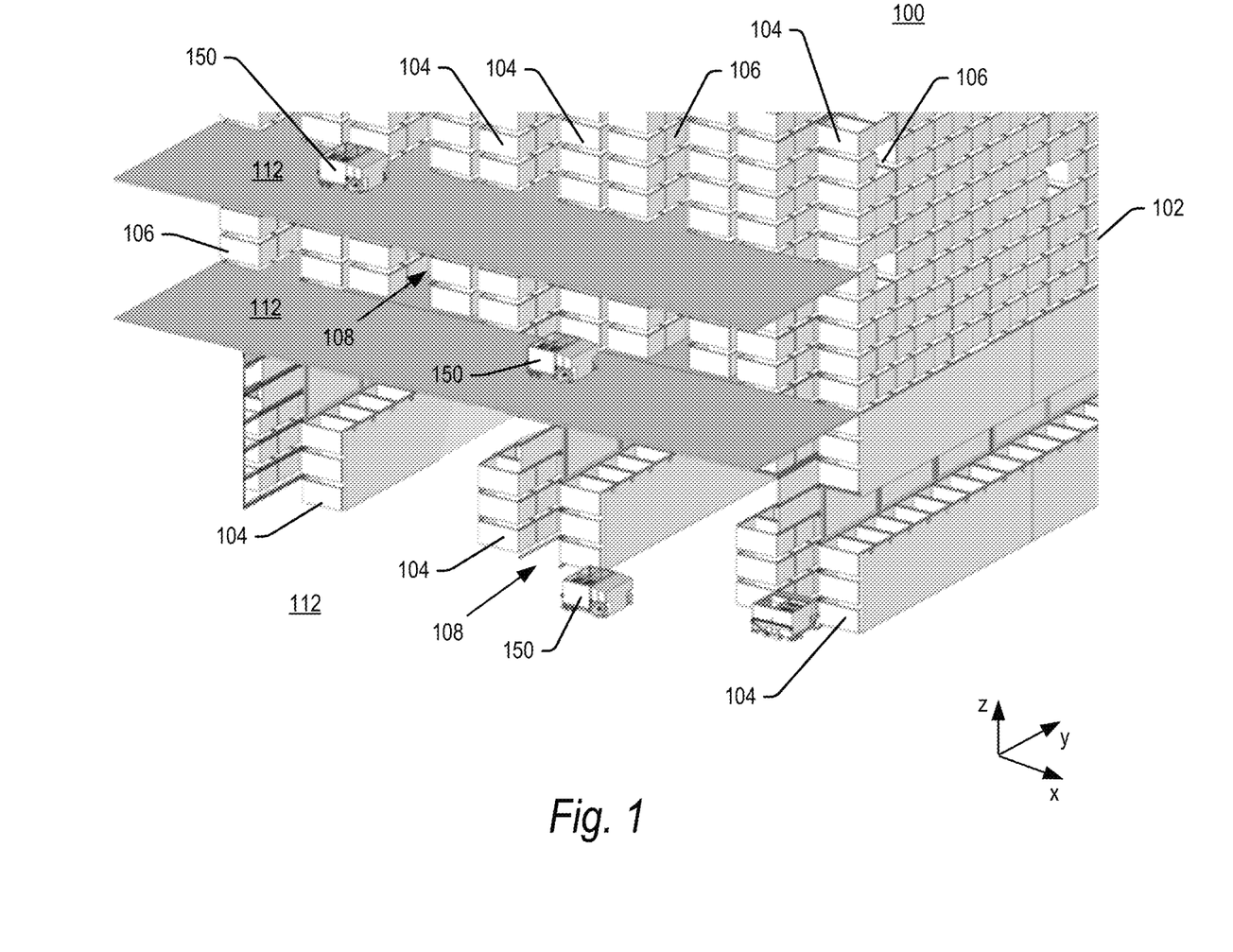
FIG. 1 is a perspective view of an order fulfillment facility according to embodiments of the present technology.

FIG. 1 shows a partial view of an embodiment of an order fulfillment facility 100 showing a storage structure 102 including a number of bays 104 of storage locations 106. In particular, each bay 104 includes a y-z array of storage locations 106 in horizontal rows and level changing towers along the rows which in embodiments may be vertical towers. As explained below, mobile robots 150 may travel between storage levels in the z-direction within the level changing towers. Pairs of bays 104 may be arranged to face each other, separated by aisles 108. An aisle 108 may have a width such that a mobile robot 150 traveling within an aisle 108 may transfer totes to the bays 104 on either side of the aisle 108. The order fulfillment facility 100 may further include decks 112 spaced apart at different horizontal levels of the storage structure 102. The decks 112 may extend between the aisles so that robots can maneuver in the x-y plane of each deck to travel between different aisles.

Figure 2:
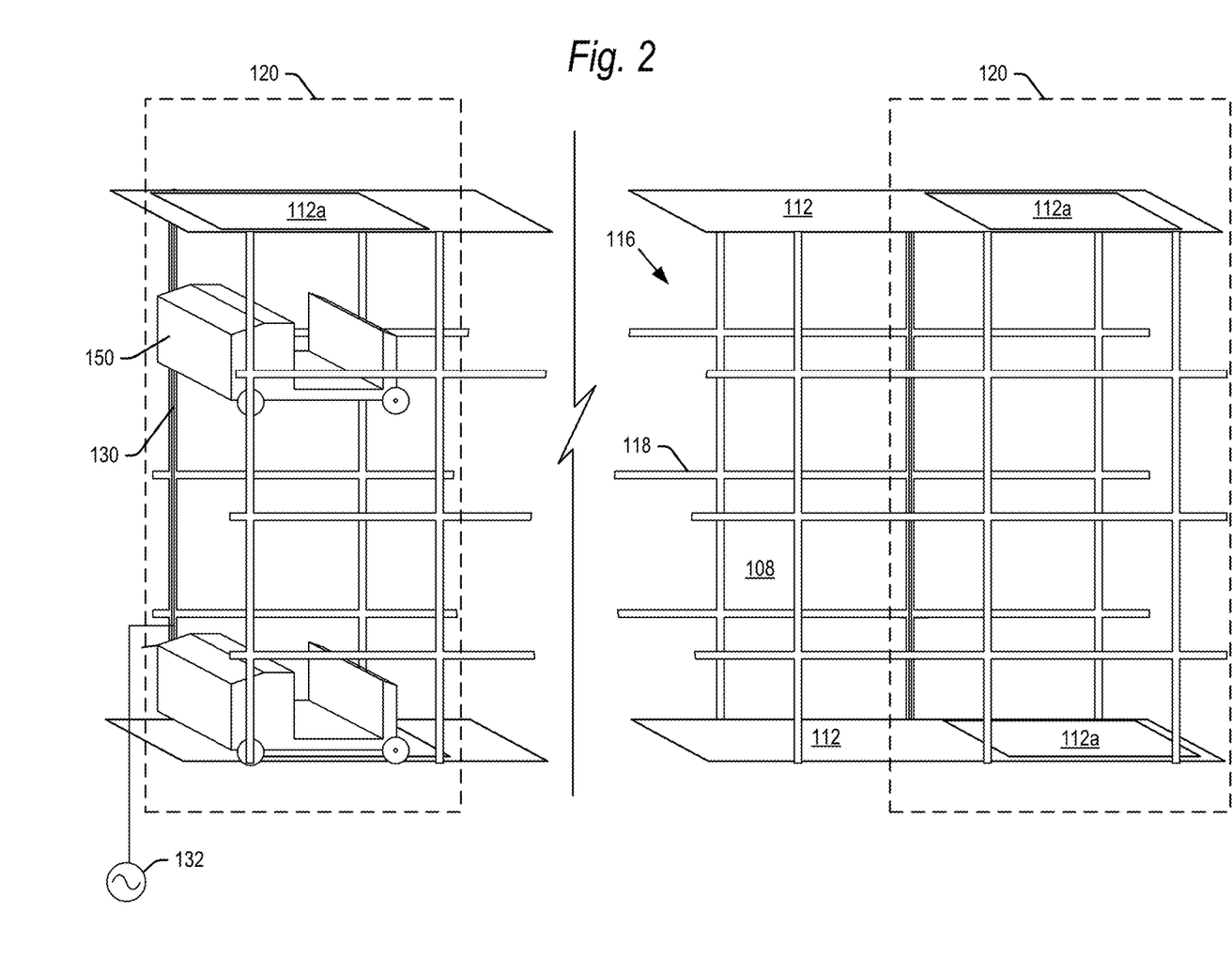
FIG. 2 is a front perspective view of a portion of a track system of the order fulfillment facility including charge rails according to embodiments of the present technology.

FIG. 2 illustrates a perspective view of a section of a track system 116 within an aisle 108. The track system 116 comprises horizontal rails 118 and level changing towers 120 (enclosed within dashed lines). The number of horizontal rails 118 and level changing towers 120 shown in FIG. 2 is by way of example only and there may be greater or fewer horizontal rails 118 and/or level changing towers 120 in further embodiments. However, in one embodiment, there is one set of horizontal rails 118 for each horizontal level of storage locations 106 within bay 104. The storage locations 106 (not shown in FIG. 2) would be positioned adjacent the track system 116, on opposed sides of the aisle 108.

The order fulfillment facility 100 may further include a number of mobile robots 150 for transferring totes or other product containers to and from workstations (not shown) and storage locations 106 in the bays 104. Mobile robots 150 are explained in greater detail below, but in general may be self-guided so as to move horizontally and vertically along track system 116 within aisles 108 to transfer totes or other product containers between the mobile robots 150 and storage locations 106. The mobile robots 150 may travel vertically in the z-direction within level changing towers 120 between levels of storage locations 106. Once at a target horizontal level, the mobile robots may move horizontally along rails 118 to a selected storage location 106 to retrieve inventory from or delivery inventory to that storage location.

The decks 112 allow travel of mobile robots 150 between and into the aisles 108 at different levels of the storage structure 102. The decks 112 may be provided with openings 112a in the deck flooring at the level changing towers. The openings 112a allow mobile robots moving vertically between levels in the level changing tower 120 to pass through one or more decks 112 within the aisle.

Further details of a storage structure, track system and mobile robot which may be used in conjunction with the present technology are described for example in the following U.S. patents and patent applications: U.S. Pat. No. 9,139,363, to John Lert, entitled "Automated System For Transporting Payloads," issued Sep. 22, 2015; U.S. Patent Application Publication No. 2016/0355337, to John Lert and William Fosnight, entitled, "Storage and Retrieval System," filed on Jun. 2, 2016; and previously mentioned U.S. Patent Application Publication No. 2017/0313514, to John Lert and William Fosnight, entitled, "Order Fulfillment System," filed on May 10, 2017. Each of these patents and applications are incorporated by reference herein in their entirety.

In accordance with aspects of the present technology, a charge rail 130 may be incorporated into the vertical track on one side of one or more of the level changing towers 120. Charge rail 130 may be electrically coupled to a facility power source 132 so as to receive the voltage from the facility power source 132. In embodiments, the voltage received in each of the one or more charge rails 130 may be an AC voltage, at for example 120 V, 220 V or 240 V. It is understood that facility power source may provide other AC voltages in further embodiments. Additionally, a voltage converter may be provided between the facility power source 132 and charge rail 130 to convert the voltage to DC voltage, or a voltage which is different than the facility power source 132.

In general, the one or more charge rails 130 draw a low current at the relatively high voltage from the facility power source. It is a feature of the present technology that the charge rail can be supplied with voltage directly from the facility power source, without having to provide chargers or other equipment at each section of charge rail to convert the voltage to a level usable by the mobile robot energy storage devices. The low current allows a relatively small cross-sectional area of charge rail 130 and low power transmission losses. In one example, charge rail 130 may carry 220 V at 50 A to deliver 11,000 W of power through the charge rail 130. These numbers are by way of example only, and may vary in further embodiments. Charge rail 130 may be a plate, wire or cable formed of a good electrical conductor such as for example copper, stainless steel, alloys thereof, or other materials. Where charge rail 130 is a plate, it may be a flat plate have a cross-sectional area of 10 mm². In further embodiments, the charge rail may be a plate which is bent along its length to form any of a variety of different cross-sectional shapes, with at least a portion that is generally flat to receive a coupling mechanism of the mobile robot as explained below. Where charge rail 130 is a wire or cable, it may have a cross-sectional area of 10 mm².

As explained below, charge rail 130 may be electrically isolated from the vertical rails of the level changing tower 120. Safety precautions may be taken to avoid human contact with charge rail 130. In one example, the charge rail 130 may be embedded in a protective insulating guard 224 (FIGS. 5 and 6) inhibiting human contact while still allowing the coupling mechanism of the mobile robots 150 to contact the charge rail 130 while moving along the level changing tower 120. In embodiments, the charge rail 130 may be provided on one side of a single level changing tower 120, some level changing towers 120, or all level changing towers 120 in the order fulfillment facility. In further embodiments, the charge rail 130 may be provided in both of the opposed tracks in a given level changing tower 120. In still further embodiments, the charge rail 130 may be incorporated into one or more of the horizontal tracks 118 instead of or in addition to being provided with the one or more level changing towers 120.

Figure 3:
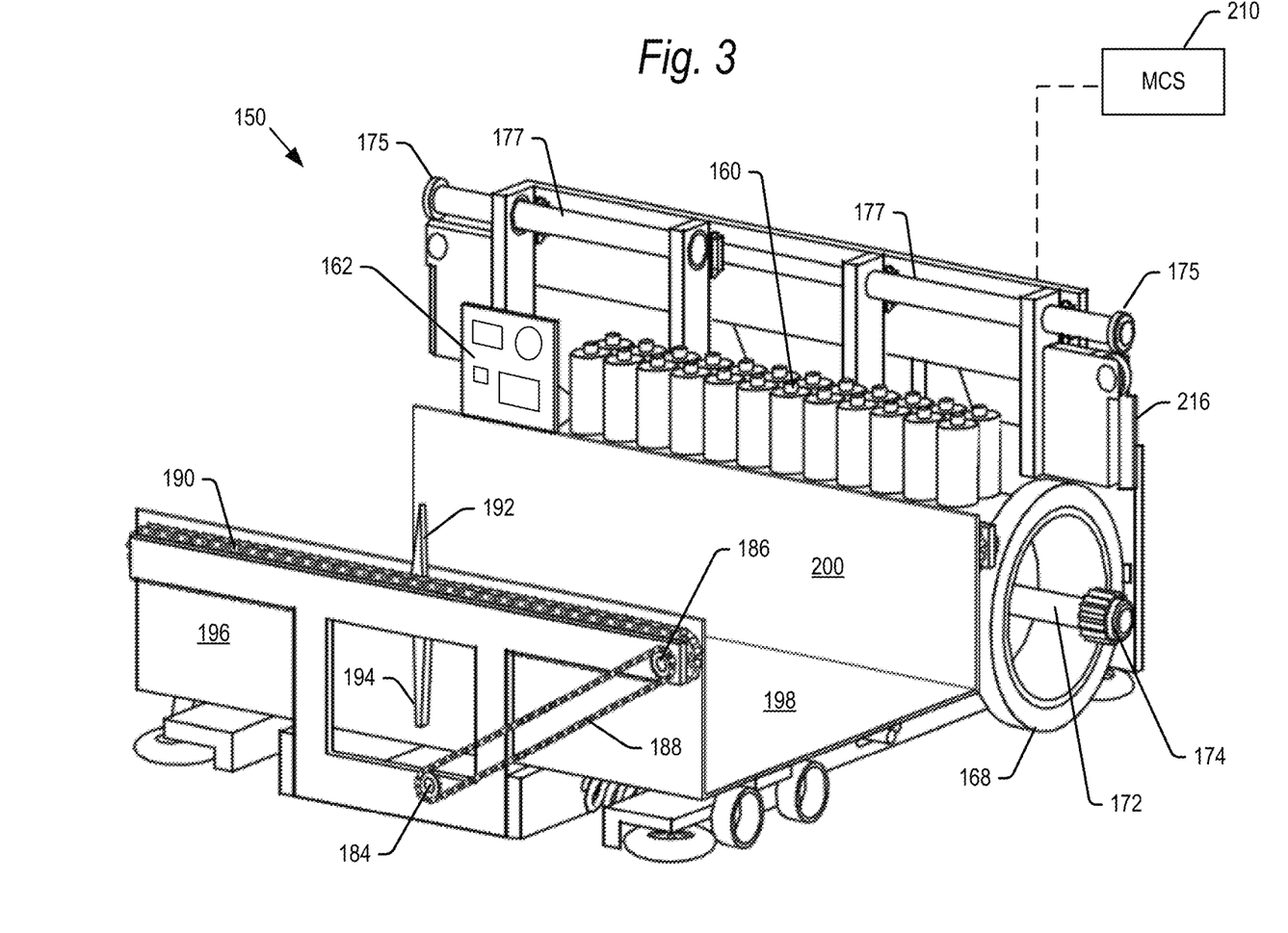
FIGS. 3 and 4 are top and bottom perspective views of a mobile robot including a rechargeable energy storage device and charger according to embodiments of the present technology.
Figure 4:
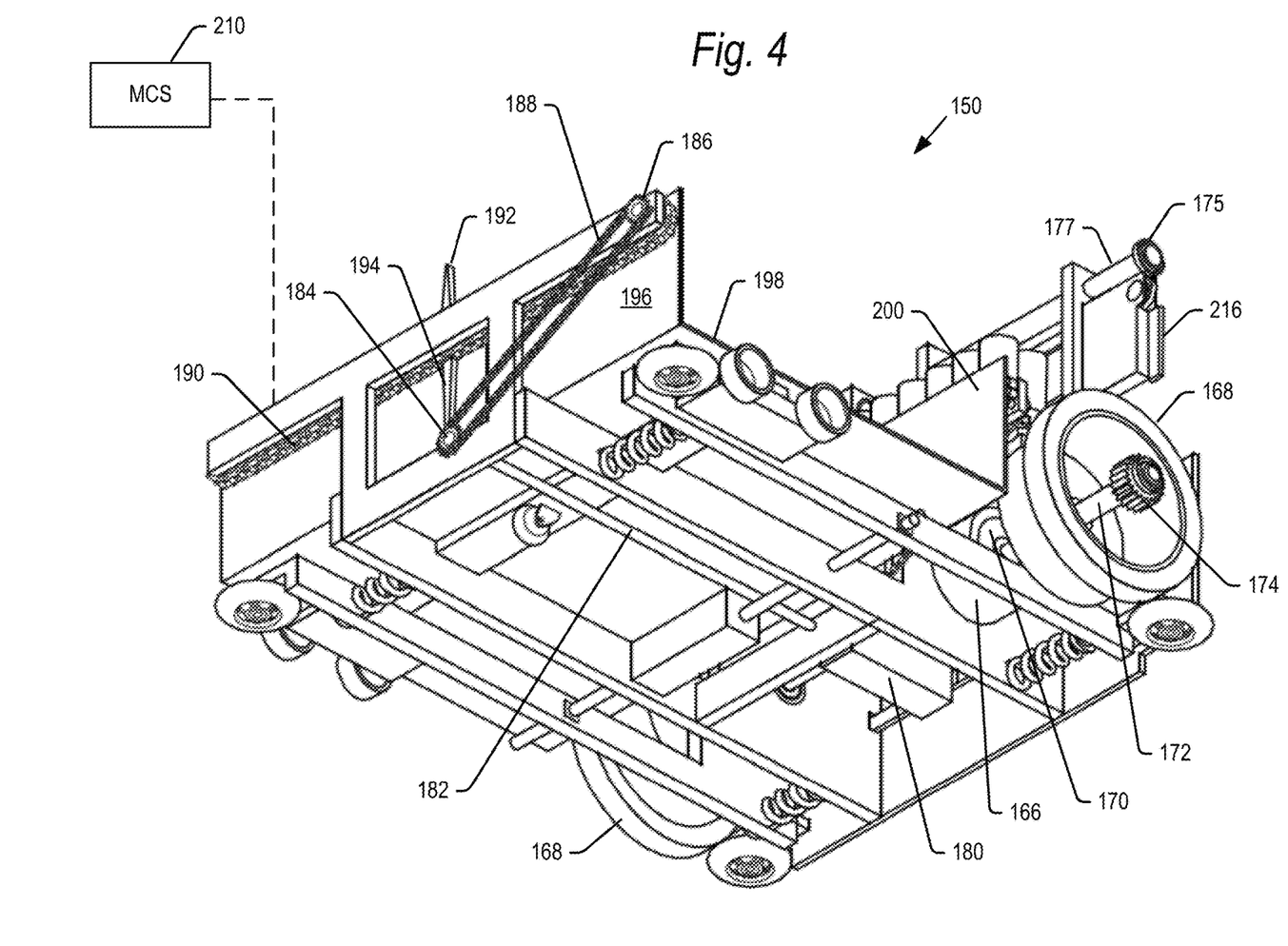
Figure 5:
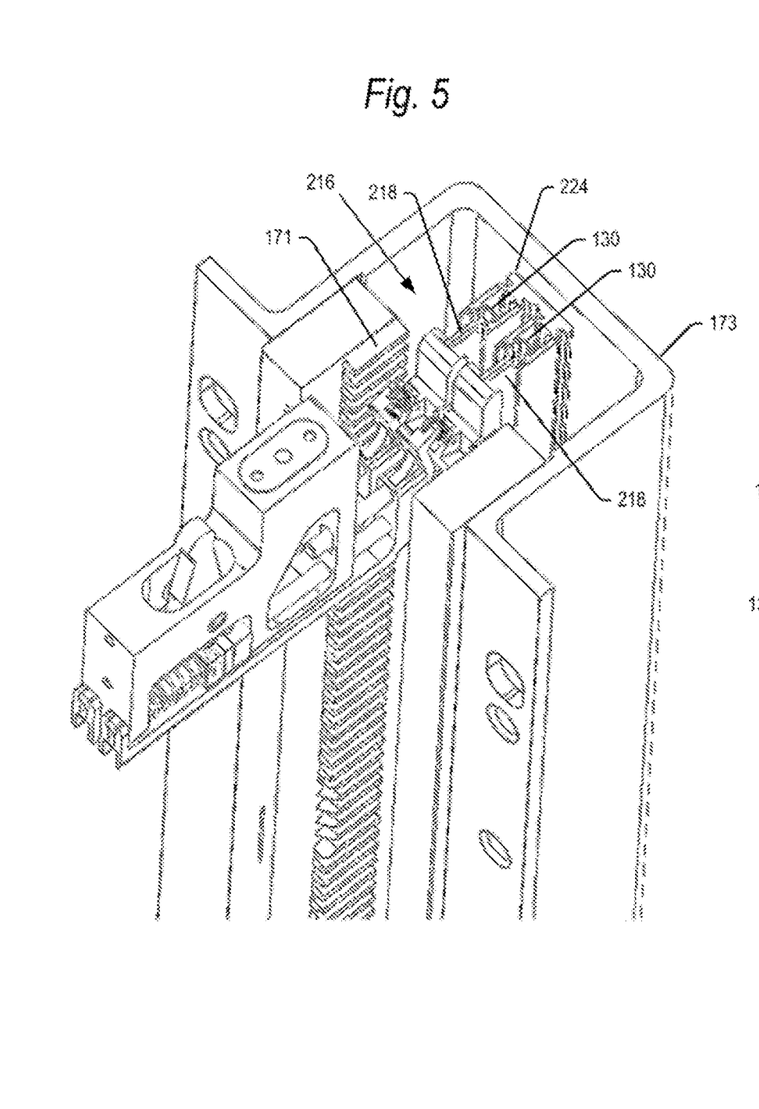
FIG. 5 shows detail of a coupling mechanism for connecting the energy storage device and charger to a charge rail of the track system.

Further details of mobile robot 150 will now be explained with reference to FIGS. 3-5. Mobile robot 150 may have onboard rechargeable energy storage device 160, also referred to herein as energy storage device 160, which in embodiments may be or include a bank of supercapacitors. Supercapacitors provide advantages as energy storage devices in that they can store for example 10 to 100 times more energy per unit volume than ordinary capacitors. Additionally, supercapacitors can accept very high current, thus enabling the supercapacitors to recharge in a very short period of time, such as a few seconds or less. Any of a variety of supercapacitors may be used in or as energy storage device 160, including for example regular electric double layer capacitors, lithium supercapacitors and ultra-low impedance capacitors. It is further understood that the onboard energy storage device 160 may be or include a variety of rechargeable power supplies other than supercapacitors in further embodiments, including for example ordinary capacitors, electrochemical batteries and other types of rechargeable power sources. The rechargeable energy storage device 160 may have an associated micro-controller for controlling operation of the energy storage device, such as for example implementing a hibernation mode explained below where loads from the mobile robot drives are disconnected from the energy storage device 160.

Mobile robot 150 further includes a charger 162 which receives a voltage from charge rail 130 and converts it to a smaller voltage usable by energy storage device 160. In embodiments, the voltage usable by energy storage device 160 may generally be determined by a combination of commercial factors, including for example which voltage would allow for the highest charge storage capacity and which voltage would offer the most energy storage per dollar. In one example, energy storage device 160 may use a voltage between 20 and 70 V, but voltages outside this range may be used in further embodiments. Further details of chargers 162 to enable independent charge management and efficient charging of mobile robots 150 is described below. While the energy storage device 160 and charger 162 are shown as separate components, in further embodiments, the energy storage device 160 and charger 162 may be integrated together.

Mobile robot 150 may further include various drive systems used to propel mobile robot 150 horizontally along deck 112 and horizontally and vertically along track system 116. In one example, mobile robot 150 may include a horizontal drive system comprising a pair of position control motors 166 (one of which is visible in FIG. 4) for controlling the rotation of drive wheels 168. The position control motors 166 may operate in tandem to advance a mobile robot along rails 118 of track system 116. The position control motors 166 may operate independently to controllably turn the mobile robot left or right when traveling on a flat surface such as deck 112.

Mobile robot 150 may further include various drive systems user to propel mobile robot vertically within level changing tower 120. In one example, mobile robot 150 may include a vertical drive 170 mounted to a drive shaft 172. The drive shaft 172 may further include a pair of guide bearings 174 at its opposed ends, each configured to engage with a gear rack 171 within a vertical channel 173 (FIGS. 5 and 6) in opposed sides of the level changing tower. Rotation of the guide bearings 174 along the gear racks by the vertical drive 170 controllably moves the mobile robot up or down within the level changing tower.

The mobile robot 150 may further include counter bearings 175 mounted at opposed ends of bearing shafts 177. The counter bearings rest against a surface behind the vertical channel receiving the guide bearings 174 in the level changing tower to maintain the mobile robot in a generally horizontal position during vertical travel.

A mobile robot 150 may further include a drive system used to retrieve and/or deliver an inventory container at a storage location 106 on either side of an aisle 108. In one embodiment, mobile robot 150 may include a container-transfer drive 180 affixed to a drive shaft 182. A drive sprocket 184 may be affixed to the opposed end of the drive shaft 182. The drive sprocket 184 may in turn be coupled to a driven sprocket 186 by a first chain 188. A second chain 190 may wrap around the driven sprocket 186. A pair of flippers 192, 194 are affixed to the second chain 190. The second chain 190 and flippers 192, 194 may be mounted on a sidewall 196 of a payload bed 198 for carrying a tote or other container. Rotation of the drive 180 rotates the second chain 190 and flippers 192, 194. An opposite sidewall 200 includes a like assembly of the second chain and flippers, which are also rotated by the drive 180. The flippers 192, 194 on both sidewalls are configured to engage features of a container seated on the payload bed 198 to transfer the container to a storage location 106. These features may also be engaged by the flippers 192, 194 on both sidewalls to transfer the container from a storage location 106 onto the payload bed 198.

The above is provided for a generalized description of some of the drive motors which may be included within the mobile robots 150 and powered by the energy storage device 160. Details of additional or alternative drive motors which may be included and powered by energy storage device 160 are provided in the above-incorporated patents and patent applications, such as for example U.S. Patent Application Publication No. 2017/0313514, to John Lert and William Fosnight, entitled, "Order Fulfillment System," filed on May 10, 2017. However, it is understood that the particular drive systems described above or otherwise used in mobile robot 150 are not critical to the charging system of the present technology, and the charging system of the present technology may be used on mobile robots having a wide variety of other or alternative drive systems, powered components and/or alternative configurations.

Each mobile robot 150 may further include an antenna (not shown) enabling the mobile robot to send and receive signals to/from a Material Control System (MCS) 210. In general, the MCS 210 controls the overall operation of the mobile robots as they travel throughout the order fulfillment facility. The MCS 210 tasks robots with pickup and delivery of inventory containers and controls the traffic flow of mobile robots throughout the facility. Generally, mobile robots 150 will at some point travel along a level changing tower 120 in performing its MCS-designated task, and the mobile robots 150 can recharge at this time without the need of a separate charge command from the MCS 210. However, it may happen that the MCS 210 tasks a robot to travel a long way without travelling in a level changing tower 120 including a charge rail 130. In this case, the MCS 210 may direct the mobile robot to charge along a level changing tower before beginning its task.

Additionally, in embodiments, the MCS 210 may monitor the power level of each mobile robot 150. In the event a mobile robot is critically low on power, the MCS 210 may redirect the mobile robot to a charge rail 130 within a level changing tower 120. Moreover, as explained below, the MCS 210 may implement a hibernate function for a mobile robot 150 when the robot is forced to wait for an extended period away from a charge rail 130.

Figure 6:
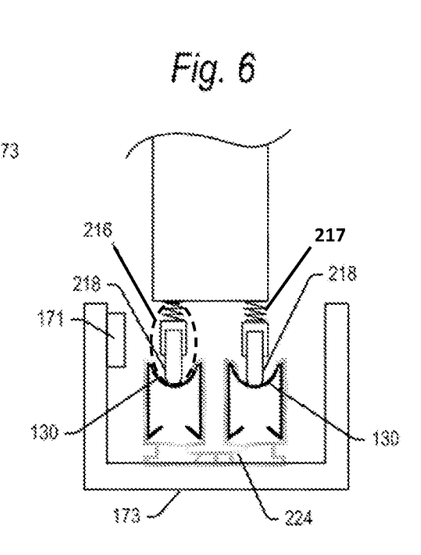
FIG. 6 is a cross-sectional view of the coupling mechanism of FIG. 5.

In operation, the present technology provides an opportunistic charge system, i.e., mobile robots 150 will charge whenever they have the opportunity to travel along a level changing tower 120 including a charge rail 130. FIGS. 3 and 4 show a coupling mechanism 216 for electrically coupling the charge rail 130 to the charger 162. FIGS. 5 and 6 show further detail of the coupling mechanism 216. The coupling mechanism 216 includes a pair of springs 217 with corresponding pair of spring-loaded charge toes 218 that are biased against the tracks of charge rail 130. The charge rail 130 may itself be positioned within a base of the channel 173. As noted above, channel 173 also includes the rack gear 171, on a sidewall of the channel, which rack gear is engaged by guide bearing 174 to enable vertical travel of the mobile robot 150.

When a mobile robot enters a level changing tower 120 including charge rail 130, the charge toes 218 are biased against the charge rail 130 so that current from the charge rail flows through the charge toes to the charger 162 to recharge the energy storage device 160. The charge toes 218 remain in contact with the charge rail for as long as the mobile robot 150 is in the level changing tower 120. The energy storage device 160 is charged in the same manner whether the mobile robot 150 is moving upward or downward within a level changing tower 120. However, the energy storage device 160 may charge more quickly where the mobile robot is moving downward as the change in potential energy may result in current from one or more of the drives travelling to the energy storage device 160.

As noted above, each mobile robot 150 may include a charger 162 for converting a voltage from the charge rail 130 to a smaller voltage that is used to charge the energy storage device 160. It is a feature of the present technology that the charger 162 is provided on each of the mobile robots 150, instead of between the facility power source and charge rails as in conventional systems. In conventional systems when a charger fails, the part of the rail serviced by that charger no longer receives power, potentially affecting some or all mobile robots which may need to be rerouted. If a charger of the present technology fails, it affects only the mobile robot on which it is located. The present technology therefore provides a highly reliable system with no single point of failure. If one robot fails, it may be taken out of circulation and easily replaced.

The present technology also provides a cost effective system, in that chargers 162 are integrated into the robot. Additionally, providing the chargers on the robots allows the rails to be powered directly by AC line power. In addition to providing a high power capability to the charge rail, this type of power source usage requires minimal charging infrastructure, e.g., a small number of charge points and low cost per charge point (overcurrent protection). Furthermore, the system can scale up easily, by adding more robots without requiring changes to the storage structure.

The present technology also provides benefits of robot longevity. As noted above, moving the charger 162 to the mobile robots means that no portion of the system needs to be shut down for maintenance when a charger fails. These benefits may be combined with an opportunistic, supercapacitor-based system, which means the energy storage device lasts for the life of the robot (>10 years), and when in operation, the robot never has to pause to be recharged.

Furthermore, provision of a charger 162 on each mobile robot 150 allows independent charge management applied locally at each mobile robot 150. The charge rate at each mobile robot is thus highly controlled. Thus, for example, a large number of robots can be added to the charge rail simultaneously, as the onboard chargers 162 regulate the charge rates of all robots. Charge rate regulation provides a variety of benefits, including ensuring the power load does not exceed the AC breaker rating. Moreover, the charger 162 can shut off the power to the energy storage device 160 when the energy storage device is fully charged. Additionally, the charger 162 prevents an electrical short between two or more mobile robots connected to the charge rail 130.

The charger 162 also controls the charge rate to be a function of the energy storage device 160 and charger 162. Specifically, the energy storage device will generally charge faster when receiving more power. In particular, the energy transferred to the energy storage device is the product of power and time (E=P·t). As the amount of time a mobile robot 150 is connected to the charge rail is limited and set by the destination of the mobile robot, energy transferred to a mobile robot is maximized by maximizing the power delivered to that robot over that time.

However, parameters of the energy storage device 160 and charger 162 together will define a maximum power, $P_{max}$, to the energy storage device 160, above which the energy storage device will not charge faster. That is, once $P_{max}$ is applied to the energy storage device 160, further increasing the applied power will not result in a faster charge. Charge rate is also a function of the power delivered by a charge rail and the number of mobile robots 150 connected to that charge rail. As noted above, conventional charge systems used a low voltage, low power charge rail.

In contrast to conventional systems, it is a feature of the present technology that several mobile robots may be charged off a single charge rail 130 at high charge rates. Where multiple robots, n, are charging off of a charge rail 130 simultaneously, the sum of the power drawn by the mobile robots n will be the power supplied by the charge rail:

$$P_{rail} = \Sigma(P_1 + P_2 + \ldots + P_n).$$

As indicated above, $P_{max}$ defines a maximum power supplied to the energy storage device, above which the energy storage device will not charge any faster. Given that the charge rail 130 of the present technology provides a high voltage and power, there is some number of robots n which can charge off a charge rail so that each may receive $P_{max}$:

$$P_{rail} \geq \Sigma(P_{1max} + P_{2max} + \ldots P_{nmax}).$$

During normal operations of the order fulfillment system, there may be as many as m robots changing levels in a given level changing tower at the same time. It is an advantageous feature of the present technology that the number of robots, n, which may charge off a charge rail 130 at $P_{max}$ is greater than the number of robots, m, that would be in the level changing tower at one time under normal operations. Thus, each of the m robots may charge at the highest charge rate allowed by the energy storage device 160 and charger 162.

Figure 7:
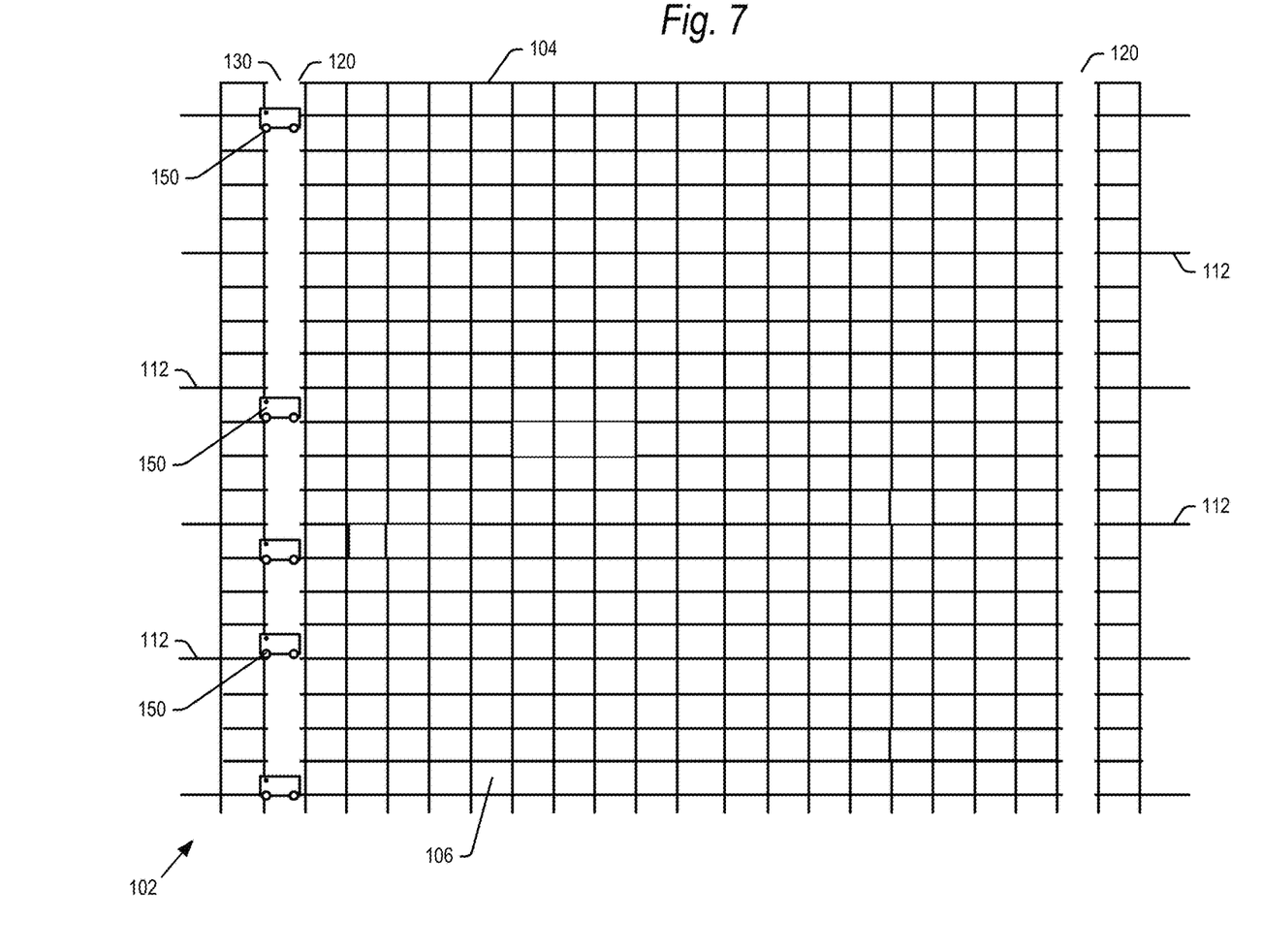
FIG. 7 is a front view of a storage bay including charge rails in the vertical towers according to embodiments of the present technology.

For example, FIG. 7 shows a bay 104 of a storage structure 102. The bay 104 includes a level changing tower 120 including a charge rail 130 as described above. The example shown includes five mobile robots 150 in the level changing tower 120, each charging off of the charge rail 130 as they move vertically. In this embodiment, five mobile robots are the most mobile robots that would be in tower 120 at any given time under normal operations.

In this example, assume that the charge rail in tower 120 is capable of delivering up to 11 kW as mentioned above. In this example, assume further that $P_{max}$ for the energy storage devices 160 on each of the five mobile robots is 2000 W. Thus:

$$P_{rail} \geq \Sigma(P_{1max} + P_{2max} + P_{3max} + P_{4max} + P_{5max}).$$

11,000 W≥Σ(2000 W+2000 W+2000 W+2000 W+2000 W)=10,000 W

As the power supplied by the charge rail 130 is greater than the sum of the $P_{max}$ for the five mobile robots 150, each of the mobile robots may be charged simultaneously by the charge rail 130 and charger 162 in the smallest possible amount of time (e.g., a few seconds) for those power supplies. Where there are less than five mobile robots 150 in the tower 120, each would still charge in the smallest amount of time. If it should happen that there were six mobile robots in the tower 120, the maximum power supplied by the rail (11 kW) would no longer be greater than the sum of the $P_{max}$ for the six mobile robots (12 kW). In this case, the six mobile robots would no longer charge in the minimum possible time, but the six mobile robots would still charge quickly (at 11 kW/6=1833 W).

It may happen that the rate at which mobile robots charge is not a critical factor. For example, during idle (non-operational) periods of the order fulfillment facility, a large number of mobile robots (e.g., 100 or more) may be stored within the tower 120 of FIG. 7, each charging off of the charge rail 130. In embodiments, the energy storage device of each mobile robot would receive a power well below $P_{max}$, and the charge time for the stored mobile robots would be well above the maximum charge rate. However, given that the robots are stored and idle, they may be charged with a low power, e.g., a trickle charge, so that after some period of time such as a few hours, all of the stored mobile robots are fully charged. The charge rate of each mobile robot may be set by a supervisory software algorithm in the MCS 210, preventing an overload condition that might otherwise trip a circuit breaker. In one example, the algorithm may set the charge rate of each mobile robot to the power capability of the charge rail divided by the number of mobile robots attached to the rail.

In further embodiments, the present technology further implements an energy storage solution including a hibernate function integrated into the energy storage device controller. The hibernate function of the energy storage device controller disconnects all power loads from the robot drives and other components from the energy storage device 160 when the robot is forced to wait for an extended period away from a charge rail 130. This may happen for a number of reasons, including for example traffic, service and/or a work stoppage. The supervisory software algorithm of MCS 210 may monitor for these or other conditions and determine that a mobile robot 150 needs to be put into a hibernation state to conserve its power. In this case, the MCS 210 sends a wireless signal to the mobile robot resulting in the energy storage device controller disconnecting all power loads from the energy storage device 160.

The MCS 210 may also convey a duration used by the energy storage device controller to periodically power up the bare minimum hardware needed for wireless communication, to see if operation is ready to resume or has resumed. The longer the time to expected service, the longer the duration between wake-ups, ensuring that energy will be available for diagnostic and motorized movement when needed. The energy storage device controller then operates independently in an ultra-low power state, counting off minutes until it is time to "check-in" with the MCS 210, and then powers the wireless communication subsystem and connects to the MCS 210. If ready, the robot is powered, and if not, the MCS 210 has the opportunity to define a new shutdown period, and the robot is returned to a hibernation state.

Integrating the hibernation functionality into the mobile robots ensures that the robots preserve energy for long periods of time when a robot is stranded away from a charge location, often preventing the need for manual robot recovery.

In summary, the present technology relates to a power supply system for a plurality of mobile robots in a facility, comprising: a charge rail mounted in a track system along which the plurality of mobile robots travel, the charge rail configured to provide a first voltage; a plurality of chargers comprising a charger on each of the plurality of mobile robots, the charger on each of the plurality of mobile robots converting the first voltage from the charge rail to a second voltage smaller than the first voltage; a plurality of rechargeable energy storage devices comprising a rechargeable energy storage device on each of the plurality of mobile robots, the rechargeable energy storage device on each of the plurality of mobile robots being charged using the second voltage.

In another example, the present technology relates to a power supply system for a plurality of mobile robots in a facility, the mobile robots configured to travel on a track system to transport containers to and from storage locations within the facility, the power supply system comprising: a charge rail mounted in the track system, the charge rail configured to provide a first voltage; a plurality of chargers comprising a charger on each of the plurality of mobile robots, the charger on each of the plurality of mobile robots converting the first voltage from the charge rail to a second voltage smaller than the first voltage; a plurality of rechargeable energy storage devices comprising a rechargeable energy storage device on each of the plurality of mobile robots, the rechargeable energy storage device on each of the plurality of mobile robots being opportunistically charged using the second voltage as each mobile robot of the plurality of mobile robots travels on the track system to transport containers to and from storage locations within the facility.

In a further example, the present technology relates to a method of charging the rechargeable energy storage devices of a plurality of mobile robots in an automated storage and retrieval system facility, comprising: (a) delivering a line voltage for the facility to a charge rail; (b) directing a mobile robot of the plurality of mobile robots to connect with a track comprising a charge rail; (c) upon connection of the mobile robot with the charge rail, converting the line voltage from the facility to a lower voltage usable to charge a rechargeable energy storage device of the mobile robot via a charger on the mobile robot; and (d) charging the rechargeable energy storage device of the mobile robot with the voltage converted in said step (c).

The foregoing detailed description of the invention has been presented for purposes of illustration and description. It is not intended to be exhaustive or to limit the invention to the precise form disclosed. Many modifications and variations are possible in light of the above teaching. The described embodiments were chosen in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. A power supply system for a plurality of mobile robots in a facility, comprising:
    a charge rail mounted in a vertical track along which the plurality of mobile robots travel, the vertical track further comprising a gear rack to enable vertical travel of the plurality of mobile robots while charging on the charge rail;
    the charge rail configured to receive an alternating current (AC) charging voltage from the facility;
    a plurality of coupling mechanisms comprising a coupling mechanism on each of the plurality of mobile robots, the coupling mechanism on a mobile robot of the plurality of mobile robots configured to be biased horizontally against the charge rail mounted on the vertical track to contact the charge rail and transfer the AC charging voltage from the charge rail to the mobile robot;
    a plurality of chargers comprising a charger on each of the plurality of mobile robots, the charger on each of the plurality of mobile robots receiving the AC charging voltage and converting the AC charging voltage from the charge rail to a second voltage smaller than the AC charging voltage; and
    a plurality of rechargeable energy storage devices comprising a rechargeable energy storage device on each mobile robot of the plurality of mobile robots, the rechargeable energy storage device on each of the plurality of mobile robots receiving the second voltage from the charger on the mobile robot and being charged using the second voltage.

2. The power supply system of claim 1, wherein the plurality of mobile robots are charged by being connected to the charge rail simultaneously.

3. The power supply system of claim 1, further comprising a controller configured to implement a hibernate function in a mobile robot of the plurality of mobile robots, the hibernate function disconnecting power loads from the rechargeable energy storage device when the mobile robot is forced to wait for an extended period away from the charge rail.

4. The power supply system of claim 1, wherein the rechargeable energy storage device is a super capacitor.

5. The power supply system of claim 4, wherein the super capacitor is one of a regular electric double layer capacitor, a lithium super capacitor and an ultra-low impedance capacitor.

6. The power supply system of claim 1, wherein at least five mobile robots of the plurality of mobile robots may simultaneously charge their rechargeable energy storage devices at a maximum rate for which the chargers and/or rechargeable energy storage devices of the at least five mobile robots are rated.

7. The power supply system of claim 1, wherein the coupling mechanism is biased to maintain contact with the charge rail while the mobile robot is traveling vertically on the vertical track.

8. The power supply system of claim 7, wherein the mobile robot maintains a horizontal position while the mobile robot is vertically traveling on the vertical track.

9. The power supply system of claim 1, wherein the coupling mechanism comprises a spring positioned to horizontally bias the coupling mechanism against the charge rail.

10. The power supply system of claim 1, wherein the mobile robot further comprises:
    a guide bearing for engaging the gear rack; and
    a counter bearing configured to rest against a surface of the vertical track to maintain the mobile robot in a generally horizontal position during vertical travel;
    wherein the coupling mechanism is positioned between the guide bearing and the counter bearing.

11. A power supply system for a plurality of mobile robots in a facility, the mobile robots configured to travel on a track system to transport containers to and from storage locations within the facility, the power supply system comprising:
    a charge rail vertically mounted in a vertical rail of a vertical portion of the track system, the charge rail configured to provide a first voltage, the vertical rail further comprising a gear rack to enable vertical travel of the plurality of mobile robots while charging on the charge rail;
    a plurality of chargers comprising a charger on each of the plurality of mobile robots, the charger on each of the plurality of mobile robots converting the first voltage from the charge rail to a second voltage smaller than the first voltage;
    a plurality of rechargeable energy storage devices comprising a rechargeable energy storage device on each of the plurality of mobile robots, the rechargeable energy storage device on each of the plurality of mobile robots being opportunistically charged using the second voltage as each mobile robot of the plurality of mobile robots travels on the track system to transport containers to and from storage locations within the facility; and
    a plurality of coupling mechanisms comprising a coupling mechanism on each of the plurality of mobile robots, the coupling mechanism on a mobile robot of the plurality of mobile robots configured to be biased horizontally against the charge rail mounted on the vertical rail to contact the charge rail and transfer the first voltage from the charge rail to the mobile robot.

12. The power supply system of claim 11, wherein a predefined maximum number of mobile robots of the plurality of mobile robots travel within the vertical portion of the track system at a given time during transport of the containers to and from storage locations within the facility, wherein the predefined maximum number of mobile robots may charge at their maximum rate while each is traveling in the vertical portion of the track system.

13. The power supply system of claim 11, further comprising a material control system (MCS) executing instructions to control the navigation of the plurality of mobile robots and to divert a mobile robot from transferring containers to and from storage locations to connection with the charge rail where it is determined by the MCS that the mobile robot requires more charge to continue transferring containers to and from storage locations.

14. The power supply system of claim 13, wherein the MC S communicates with the charger on each of the plurality of mobile robots to independently control the charging of each of the plurality of mobile robots.

15. The power supply system of claim 13, wherein the MCS controls a number of mobile robots in the vertical portion of the track system at a given time so that all mobile robots in the vertical portion may charge at a maximum rate of the mobile robots.

16. The power supply system of claim 13, wherein the MCS positions the plurality of mobile robots on the vertical portion of the track system to charge at a rate slower than a maximum charge rate of the mobile robots at idle periods of the facility.

17. The power supply system of claim 11, wherein the first voltage is the line voltage from the facility.

18. A method of charging rechargeable energy storage devices of a plurality of mobile robots in an automated storage and retrieval system (ASRS) facility, comprising:
 (a) delivering an AC line voltage for the (ASRS) facility to a charge rail;
 (b) propelling a mobile robot of the plurality of mobile robots along a vertical track comprising the charge rail, the mobile robot comprising a coupling mechanism configured to be biased horizontally against the charge rail mounted on the vertical track to contact the charge rail;
 (c) upon connection of the mobile robot with the charge rail, converting the AC line voltage from the (ASRS) facility to a lower voltage usable to charge a rechargeable energy storage device of the mobile robot via a charger on the mobile robot; and
 (d) charging the rechargeable energy storage device of the mobile robot with the lower voltage converted in said step (c) while the mobile robot is propelled along the vertical track in said step (b).

19. The method of claim 18, wherein said step (b) of propelling a mobile robot of the plurality of mobile robots along a vertical track is performed for a purpose independent of charging the mobile robot.

20. The method of claim 18, wherein said step (d) of charging the rechargeable energy storage device of the mobile robot comprising the step of charging the rechargeable energy storage device of the mobile robot at a maximum rate for which the charger and/or the rechargeable energy storage device are rated where a plurality of mobile robots are connected to the charge rail.

* * * * *

UNITED STATES PATENT AND TRADEMARK OFFICE
CERTIFICATE OF CORRECTION

| | | |
|---|---|---|
| PATENT NO. | : 12,009,678 B2 | Page 1 of 1 |
| APPLICATION NO. | : 16/269900 | |
| DATED | : June 11, 2024 | |
| INVENTOR(S) | : Matthew W. Coady | |

It is certified that error appears in the above-identified patent and that said Letters Patent is hereby corrected as shown below:

In the Claims

In Column 13, Claim 14, Line 4, delete "MC S" and insert -- MCS --, therefor.

Signed and Sealed this
Seventeenth Day of September, 2024

*Katherine Kelly Vidal*

Katherine Kelly Vidal
*Director of the United States Patent and Trademark Office*